No. 614,584. Patented Nov. 22, 1898.
A. W. SMITH.
SPEED INDICATOR.
(Application filed Feb. 26, 1898.)
(No Model.)
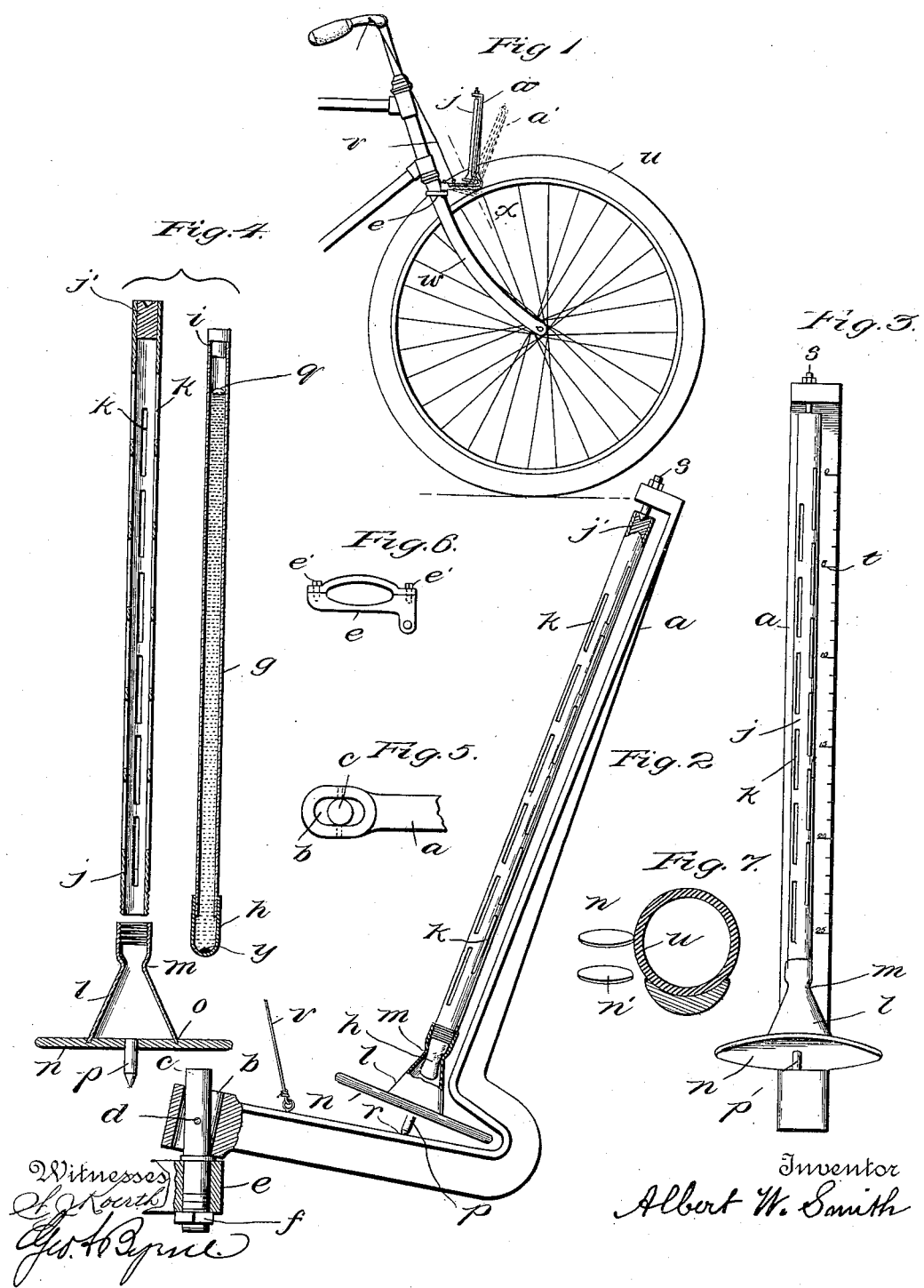
Inventor
Albert W. Smith
Witnesses

UNITED STATES PATENT OFFICE.

ALBERT W. SMITH, OF WASHINGTON, DISTRICT OF COLUMBIA.

SPEED-INDICATOR.

SPECIFICATION forming part of Letters Patent No. 614,584, dated November 22, 1898.

Application filed February 26, 1898. Serial No. 671,816. (No model.)

*To all whom it may concern:*

Be it known that I, ALBERT W. SMITH, a citizen of the United States, residing at Washington, in the District of Columbia, have invented a new and useful Improvement in Speed-Indicators for Bicycles, of which the following is a specification.

The object of this invention is to provide a simple and cheap speed-indicator adapted to be attached to the front fork of a bicycle and receive its motion directly from the tire.

To these ends the invention consists in the employment of a glass tube having at its lower end a rubber bulb, a liquid contained in said bulb and tube, and means for imparting rotary motion to said bulb and tube, the whole being adapted to indicate the rate of speed per hour at which the bicycle or other vehicle is moving upon a suitable graduated scale.

In the drawings herewith, Figure 1 is a partial side view of a bicycle, showing the indicator in position on the front fork. Fig. 2 is a side view of the indicator. Fig. 3 is a front view thereof. Figs. 4, 5, 6, and 7 are detail views.

In all the views the same letters indicate like or corresponding parts.

$a$ is the indicator-frame having the oblong slot $b$, embracing the pin $c$ and pivoted thereon by means of pivot-pin $d$.

$e$ is a well-known form of clip adapted to be secured to a bicycle, as shown in Fig. 1. The swivel-pin $c$ is secured to the clip $e$ by means of the nut $f$, Fig. 2. In Fig. 6 is shown a plan view of the clip $e$, which consists of two separable parts adapted to be clamped to the front fork by means of screws $e'$ $e'$.

$g$ is a transparent sight-gage tube, of glass or celluloid, closed at its lower end by an elastic rubber bulb $h$ and at its upper end by the shouldered rubber stopper $i$.

$j$ is a metal armor-tube closed at the top by the plug $j'$ and having a series of sight-slits $k$ $k$, so arranged that there are at all points in the length of the tube two diametrically opposite slits, as shown in Fig. 4, the sets of slits being at right angles with each other and overlapping each other, thus insuring the result that light may pass through tube $j$ while it is in motion. The object in staggering the sets of slits with each other is to obtain a stronger construction than would be possible with a single set of slits running the entire length of the tube.

The gage-tube $g$ is filled with any suitable non-freezing liquid $q$, as alcohol, ether, acid, &c., preferably colored red, blue, &c., to make the same more easily visible, and is then placed into the armor-tube $j$, the stopper $i$ abutting against the plug $j'$. The tube $j$ is then screwed into the conical base-tube $l$ until the lower end of the gage-tube $g$ abuts against the contracted or crimped portion $m$ of base-tube $l$, as shown in Fig. 2, thus firmly holding the gage-tube $g$ and effectually sealing the junction between bulb $h$ and tube $g$ against leakage. The conical tube $l$ is let into the driving-disk $n$, as shown at $o$ in Fig. 4, and soldered thereto.

$p$ is a steel pivot secured to disk $n$, as shown.

The indicator is mounted in the frame $a$, as shown in Figs. 2 and 3, the pivot-point $p$ fitting into a suitable center at $r$ and pivot-point $s$ pivoting the upper end, as shown.

On the frame $a$ is marked a suitable graduated scale $t$, as shown in Fig. 3, reading in miles per hour.

The indicator is now secured to the front fork $w$, as shown in Fig. 1, by means of the clip $e$.

When the indicator is out of use, it has the position indicated by the dotted outline $a'$, Fig. 1. If the rider desires to learn the speed at which he is traveling, he pulls the cord $v$, one end of which is secured to the indicator and the other to the handle-bars, as shown. The indicator then assumes the position shown in full lines in Fig. 1 and disk $n$ comes into contact with tire $u$, as indicated by the upper disk $n$ in Fig. 7, which is a sectional view on line $x$, Fig. 1. When out of use, the disk $n$ has the position relative to tire $u$ as shown by the lower disk $n'$, Fig. 7. This movement of the indicator is permitted by the oblong slot $b$, which permits of a limited angular movement of frame $a$ on pivot-pin $d$, as shown in Figs. 2 and 5.

When the nut $f$ is unscrewed, the indicator can be adjusted to or from tire $u$ and then firmly secured in the desired position by screwing up nut $f$, thus providing the means of securing the necessary frictional contact between tire $u$ and disk $n$.

The operation is as follows: When the indicator is at rest, the liquid $q$ stands at the zero-mark on scale $t$. If now the cord $v$ is pulled, the disk $n$ is made to engage with tire $u$ and the indicator is set in rapid rotation, thus causing the liquid contained in bulb $h$ to stretch the latter by the action of centrifugal force, thus causing the liquid $q$ to fall in the tube $g$ proportionately to the speed, which can be read off on scale $t$, the position of the liquid being visible through the sight-slits $k\ k$. It will be seen that the indicator depends for its action on the elasticity of bulb $h$ and the specific gravity of liquid $q$. Now as no two bulbs $h$ can have exactly the same elasticity it would be necessary to graduate the scale of each indicator separately. This, however, is an expensive proceeding and would make the cost of production too great. To overcome this difficulty, I vary the specific gravity of the liquid in bulb $h$ by employing two liquids therein, one being heavier than the other.

If when the indicator is tested it is found that at a given speed the liquid $q$ is not sufficiently lowered, a small quantity of mercury $y$ is placed in the bulb $h$, thus increasing the specific gravity of its compound contents to the desired amount, thereby producing a greater distention of the bulb $h$ when in motion and causing the liquid $q$ to be lowered to the point on the scale $t$ corresponding to the speed of the indicator. It will be seen that this method furnishes a ready means of calibrating the indicators to fixed and arbitrary scale-divisions and enables the scales to be cheaply produced in large quantities. Any heavy liquid or solid substance, as lead shot, &c., can be used instead of the mercury $y$.

Having now fully described my invention and its mode of operation, what I claim, and desire to secure by Letters Patent, is as follows:

1. In a liquid speed-indicator, the combination with a transparent tube $g$, of the elastic bulb $h$, as set forth.

2. In a liquid speed-indicator, the combination with a transparent tube, of an elastic member or part combined therewith, and together with said tube forming a structure adapted to contain and retain a liquid or fluid substance, as set forth.

3. In a liquid speed-indicator, in combination, the transparent tube $g$, bulb $h$, armor-tube $j$ having sight-slits $k\ k$, base-tube $l$ having the contraction $m$, disk $n$ having pivot $p$, frame $a$ having slot $b$ embracing pin $c$, the pivot-pin $d$ pivoting frame $a$ on pin $c$, and the nut $f$ adjustably securing pin $c$ to clip $e$, substantially as set forth.

4. In a liquid speed-indicator, the combination with a transparent tube $g$, of an elastic bulb or tubular extension $h$, adapted to expand under the influence of the centrifugal force exerted by its inclosed contents, as set forth.

ALBERT W. SMITH.

Witnesses:
    EMMA M. GILLETT,
    A. W. HARRISON.